June 5, 1934.　　　　P. HENCKELL　　　　1,962,016
COMBINED HEATING ARRANGEMENT, ESPECIALLY FOR
BAKING OVENS AND FOR PRODUCING STEAM
Filed Dec. 31, 1931
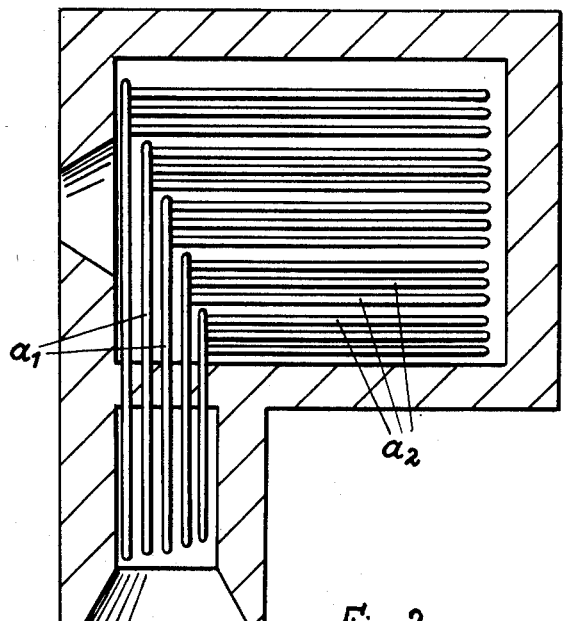
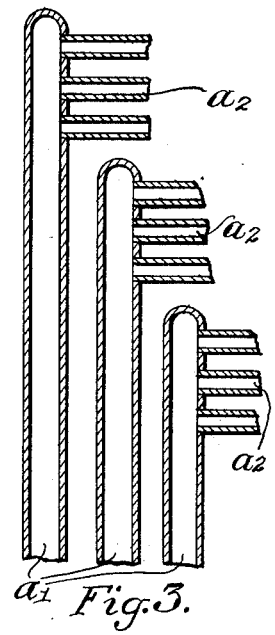
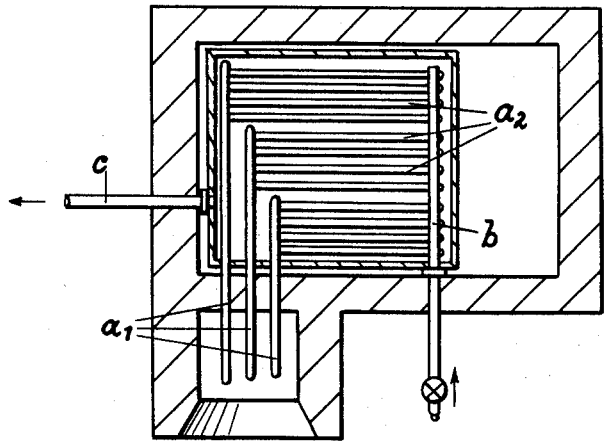

Patented June 5, 1934

1,962,016

UNITED STATES PATENT OFFICE 1,962,016

COMBINED HEATING ARRANGEMENT, ESPECIALLY FOR BAKING OVENS AND FOR PRODUCING STEAM

Peter Henckell, Hamburg, Germany

Application December 31, 1931, Serial No. 584,153
In Germany January 5, 1931

1 Claim. (Cl. 107—63)

The heating of baking ovens and also the production of steam by Perkins tubes is known. This method of heating is effected by heating tubes filled with suitable media, one end of which tubes extends into the furnace, the remaining portion of the tubes forming the heating surface. For this purpose the heating tubes are arranged in such a manner that a relatively large number, sufficient to produce a heating surface of the desired size, project in superposed rows into the furnace. The laying of these tubes presents certain difficulties on account of the danger of explosion. In view of this fact these heating tubes have been constructed to meet this condition. It has been proposed to reinforce or to fit reinforcements at the points endangered, without however it being possible to reduce the number of tube ends extending into the furnace.

The present invention is a perfect solution of this problem, taking particularly into consideration the fitting in baking oven or for producing wet steam. Consequently, not only the danger of explosion is taken into consideration by the reduced number of tubes projecting into the furnace, that is the fitting in and removing from smaller furnace spaces than were hitherto customary. Therefore only a reduced number of stronger, larger tubes are placed in the furnace, whereas a larger number of these tubes branch off in a straight line for the heating surface.

Two embodiments of the invention are illustrated by way of example in the accompanying drawing, in which:—

Fig. 1 shows tubes arranged for a baking oven.

Fig. 2 shows tubes arranged for producing wet steam.

Fig. 3 is a longitudinal section through the tubes.

The heating surface consists of strong tubes $a_1$ extending into the furnace and of tubes $a_2$ branching therefrom like fingers. Owing to these branches a flat heating surface is produced, bending out of the horizontal and any bending of the tubes $a_2$ being intentionally avoided, so that the walls of the tubes are not overstressed in the bends by torsion and compression.

In Fig. 2 $b$ designates a spraying tube, through which water is conveyed over the tubes $a_2$. The wet steam thus produced is drawn off through the tube $c$.

I claim:—

A combined heating arrangement especially for baking ovens and for wet steam producing, comprising in combination a baking oven, a furnace, thick tubes extending from the furnace into the baking oven and several thinner tubes branching at right angles from each of said thick tubes, the thin tubes extending from the thick tubes forming a flat heating surface in the baking oven.

PETER HENCKELL.